United States Patent Office 3,795,608
Patented Mar. 5, 1974

3,795,608
PROCESS FOR SEPARATING AROMATIC HYDRO-
CARBONS BY EXTRACTION
Susumu Fujiyama and Seizi Uchiyama, Niigata, Japan,
assignors to Mitsubishi Gas-Chemical Company, Inc.,
Tokyo, Japan
Filed Nov. 5, 1971, Ser. No. 196,095
Claims priority, application Japan, Nov. 5, 1970,
45/96,844
Int. Cl. C07c 7/10
U.S. Cl. 208—324    6 Claims

ABSTRACT OF THE DISCLOSURE

Aromatic hydrocarbons are separated from a mixture containing the aromatic hydrocarbons and non-aromatic hydrocarbons by contacting the mixture with a complex solution consisting of hydrogen fluoride, boron fluoride and m-xylene and/or polymethylbenzene of $C_9$ or higher as an extracting solvent at a temperature of 30° to −20° C. under a pressure of 0.5 to 5 kg./cm.$^2$ g. The complex solution has a molar ratio of boron fluoride to hydrogen fluoride of 0.05–0.20:1 and a molar ratio of m-xylene and/or polymethylbenzene of $C_9$ or higher to boron fluoride of 0.6–0.9:1.

This invention relates to a process for extracting aromatic hydrocarbons from a hydrocarbon mixture containing aromatic hydrocarbons and non-aromatic hydrocarbons.

Heretofore, diethylene glycol, sulforane, N-methylpyrrolidone, dimethyl sulfoxide, etc. are known as an extracting solvent for extracting aromatic hydrocarbons from a mixture of aromatic hydrocarbons and non-aromatic hydrocarbons.

The present invention is to provide a process for extracting aromatic hydrocarbons from the mixture using a complex solution of hydrogen fluoride, boron fluoride and m-xylene and/or polymethylbenzene of $C_9$ or higher as the extracting solvent.

A process for separating m-xylene having the highest basicity from a mixture of $C_8$ aromatic hydrocarbons by extraction using an extracting agent consisting of hydrogen fluoride and boron fluoride has been already used in an industrial scale. In the present invention, a complex solution containing m-xylene and/or polymethylbenzene of $C_9$ or higher obtained in said process for extraction based on the extracting agent of hydrogen fluoride and boron fluoride can be used as such for the extraction of aromatic hydrocarbon. Therefore, a particularly economic advantage can be obtained when the present process is used in connection with said m-xylene extraction process.

The present inventors have found that a complex solution of hydrogen fluoride, boron fluoride and m-xylene and/or polymethylbenzene of $C_9$ or higher can selectively dissolve aromatic hydrocarbons such as benzene, toluene, xylene, etc. from a solution mixture thereof with non-aromatic hydrocarbons such as aliphatic and alicyclic hydrocarbons and further have found that the solubilities of the aromatic hydrocarbons are almost independent of the basicities of the hydrocarbons at that time. Therefore, the present extraction mechanism is clearly distinguished from such a mechanism that an extracting agent consisting of hydrogen fluoride and boron fluoride selectively forms a complex with m-xylene or polymethylbenzene of $C_9$ or higher thereby to separate and extract m-xylene or polymethylbenzene from other aromatic hydrocarbons. This mechanism will be explained referring to the accompanying drawings.

Figure 1:
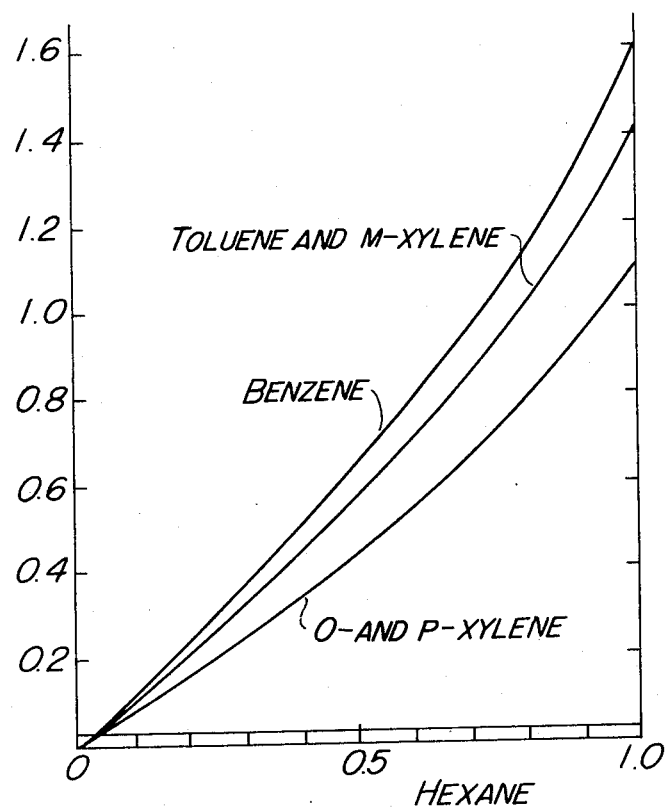
FIG. 1 is a diagram showing solubilities of aromatic hydrocarbons in a complex solution of hydrogen fluoride-boron fluoride-m-xylene.

In FIG. 1, a composition (mole fraction) of aromatic hydrocarbon in a raffinate layer in an equilibrium state with a complex solution is shown on the axis of abscissa and a molar ratio of the hydrocarbon extracted into the extract layer to boron fluoride is shown on the axis of ordinate, when a complex solution having a composition of hydrogen fluoride:boron fluoride:m-xylene=10:1:0.8 by mole is contacted with various hydrocarbons diluted with hexane at a temperature of 6° C., and the amount of aromatic hydrocarbons dissolved in the complex solution, and the amount of hexane are measured. It is clear from the diagram that, though the amounts of aromatic hydrocarbons dissolved in the complex solution of hydrogen fluoride, boron fluoride and m-xylene are slightly differed from one another by the kind of the aromatic hydrocarbons, the basicities of the aromatic hydrocarbons do not always correspond to the solubilities thereof. That is to say, benzene having the lowest basicity is most soluble in the present complex solution and m-xylene having the highest basicity is less soluble than benzene and is as soluble as toluene. Furthermore, alkyl-substituted benzenes, for example, ethyl- or propyl-substituted benzene, are also soluble in the present complex solution, but their solubilities in the extract layer are decreased, in any case, with a decrease in concentration of aromatic hydrocarbons in the raffinate layer. The solubilities of non-aromatic hydrocarbons such as hexane, etc. are very low, irrespective of the composition of the raffinate layer.

A molar ratio of boron fluoride to hydrogen fluoride of the present extracting solvent, that is, the complex solution is 0.05 to 0.20. When the molar ratio is less than 0.05 or more than 0.20, the solubility of the aromatic hydrocarbon is lowered. Molar ratio of m-xylene and/or polymethylbenzene of $C_9$ or higher as a component for the present complex solution to boron fluoride is preferably 0.6 to 0.9. When the molar ratio is less than 0.6 or more than 0.9, the solubility of the aromatic hydrocarbon is rapidly lowered. Particularly when the molar ratio is too small, such tendency is remarkable. Preferable temperature for the extraction is 30° to −20° C., and preferable pressure for the extraction is 0.5 to 5 kg./cm.$^2$ g.

As the hydrocarbon mixture to which the present extracting solvent is applicable, any kind of mixtures containing aromatic and non-aromatic hydrocarbons can be used, but since the present extracting solvent contains such Friedel-Crafts catalyst as hydrogen fluoride and boron fluoride, various undesirable side reactions take place when a hydrocarbon mixture containing a large amount of olefins is used as a raw material, and consequently there is a fear of loss in useful aromatic components. Therefore, it is not preferable to use the hydrocarbon mixture containing a large amount of olefins as the raw material.

To extract the aromatic hydrocarbons by the present extracting solvent, the ordinary extracting apparatus is used and the hydrocarbon mixture is made simply to contact the present extracting solvent counter-currentwise. The complex layer is a hydrogen fluoride layer which forms a layer distinguished from the hydrocarbon layer as a heterogeneous layer. The complex layer has a larger specific gravity and can readily extract the aromatic hydrocarbons from the mixture in a continuous manner in the ordinary extracting apparatus.

To separate and recover from the solvent the aromatic hydrocarbons extracted by the present extracting solvent, the extract solution is made to contact a back-extracting solvent countercurrentwise, whereby the extracted aromatic hydrocarbons are back-extracted into the back-extracting solvent, and then the resulting back-extracted solution can be distilled, or the extracted solution is thermally decomposed to remove hydrogen fluoride and boron fluoride, and then the remaining solution is distilled. Furthermore, when the present process is combined with a process for separating xylene isomer, the extracted solution may be fed to the extractor column of xylene isomer directly and used as the raw material for xylene extraction. Preferable back-extracting solution is saturated hydrocarbons capable of being readily separated from the extracted aromatic hydrocarbons by distillation. For example, pentane is preferably used when the extracted aromatic hydrocarbon is benzene, and pentane, hexane, etc. are preferably used when the extracted aromatic hydrocarbon is toluene or xylene. When the separation and recovery are carried out according to the thermal decomposition method, the complex is decomposed at first by heating thereby to separate hydrogen fluoride and boron fluoride in a gaseous phase, and then the remaining hydrocarbons are separated from one another by distillation or the like. Therefore, the thermal decomposition method cannot be used unless the extracted hydrocarbons can be readily separated from the hydrocarbon serving as one component of the present extracting solvent. The thermal decomposition method can be used when benzene and toluene are extracted by a complex solution of hydrogen fluoride-boron fluoride-m-xylene or when benzene, toluene and xylene are extracted by a complex solution of hydrogen fluoride-boron fluoride-trimethylbenzene.

Now, the processes using the present extracting solvent will be explained, referring to the accompanying drawings.

Figure 2:
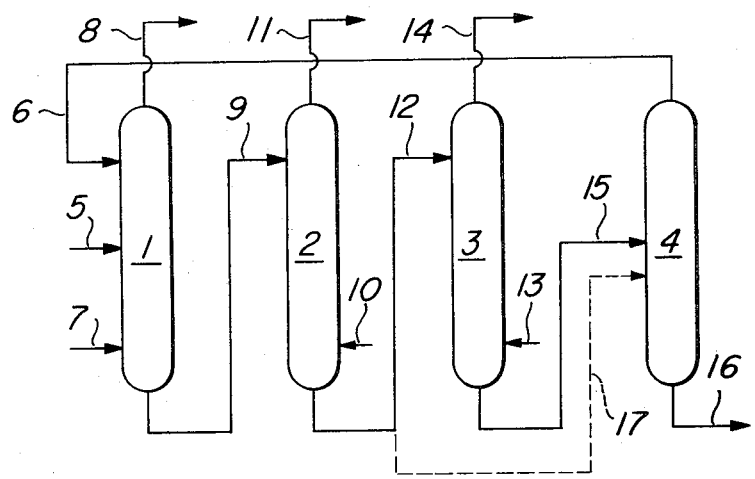
FIGS. 2 and 3 are flow diagrams showing combinations of the present process with a process for separating xylene isomers.

FIG. 2 shows a process based on a combination of a step for extracting m-xylene from a xylene mixture by an extracting agent consisting of hydrogen fluoride and boron fluoride with a step for extracting benzene and toluene from a hydrocarbon mixture consisting of benzene, toluene and non-aromatic hydrocarbons by the resulting complex solution of hydrogen fluoride-boron fluoride-m-xylene as the extracting solvent. In FIG. 2, numeral 1 is an m-xylene extraction column for extracting m-xylene from a xylene mixture using an extracting agent consisting of hydrogen fluoride-boron fluoride, 2 an aromatic hydrocarbon extraction column of the present invention, 3 an aromatic hydrocarbon stripper and 4 a complex decomposition column.

That is to say, a xylene mixture is fed from a line 5 to the m-xylene extraction column 1, and only m-xylene is extracted from the mixture by hydrogen fluoride and boron fluoride supplied from a line 6. At that time, hexane is supplied to the column 1 from a line 7 as a diluent and therefore no other aromatic hydrocarbons than m-xylene are dissolved in the resulting complex solution of hydrogen fluoride-boron fluoride-m-xylene. Xylene raffinate other than m-xylene and the diluent are withdrawn from a line 8. The resulting complex solution has a suitable composition as an extracting solvent for the aromatic hydrocarbons and is led to the aromatic hydrocarbon extraction column 2 from a line 9. The fed extracting solvent extracts aromatic hydrocarbons from a raw material hydrocarbon mixture fed from a line 10, and the raffinate solution is withdrawn from 11. The complex solution containing the aromatic hydrocarbons in a dissolved state is led to the aromatic hydrocarbon stripper 3 from a line 12 and contacts a back-extracting solvent fed from a line 13 countercurrentwise, whereby other aromatic hydrocarbons than m-xylene are withdrawn from a line 14 together with the back-extracting solvent. The m-xylene complex solution is led to the decomposition column 4 through a line 15, and thermally decomposed therein. M-xylene is withdrawn from a line 16, and hydrogen fluoride and boron fluoride are withdrawn from the line 6. Sometimes, the complex solution obtained in the aromatic hydrocarbon extraction column 2 is directly fed to the decomposition column 4 through a line 17 as shown by dotted line, and hydrogen fluoride and boron fluoride are withdrawn from the line 6, and a mixture of aromatic hydrocarbons is withdrawn from the line 16 and is further separated from one another by distillation.

Figure 3:
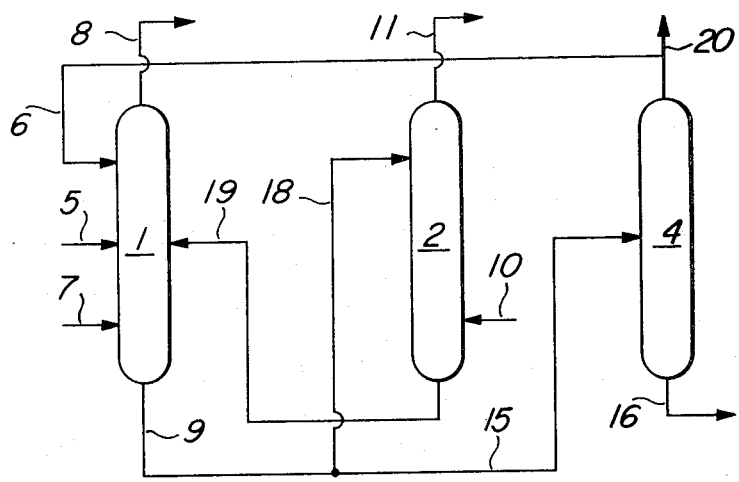

FIG. 3 shows a process based on a combination of a step for extracting m-xylene from a xylene mixture by an extracting agent consisting of hydrogen fluoride and boron fluoride with a step for extracting and separating aromatic hydrocarbons containing xylene mixture as a main component using the thus obtained complex solution of hydrogen fluoride-boron fluoride-m-xylene as an extracting solvent. In FIG. 3, numerals 1, 2 and 4 represent the same items as defined in FIG. 2, respectively. A xylene mixture is fed to the m-xylene extracting column 1 from a line 5, and hydrogen fluoride and boron fluoride are fed from a line 6. A diluent is fed from a line 7. Only m-xylene is extracted into hydrogen fluoride and boron fluoride through counter-current contact. A raffinate solution is withdrawn from a line 8, and the resulting m-xylene complex is withdrawn from a line 9. A portion of the m-xylene complex is fed to the aromatic hydrocarbon extraction column 2 as an extracting solvent from a line 18, and the remaining portion thereof is fed to the decomposition column 4 through a line 15. The raw material containing aromatic hydrocarbons to be separated is fed to the column 2 from a line 10, and the raffinate solution is withdrawn from a line 11. The complex solution containing extracted aromatic hydrocarbons contains a mixture of xylene isomers, and therefore, is returned to the m-xylene extraction column 1 to separate m-xylene from other xylene isomers. In the decomposition column 4, the m-xylene complex is decomposed and hydrogen fluoride and boron fluoride are withdrawn from the line 6, and m-xylene is withdrawn from a line 16.

As described above, the present invention will have a very large effect, when the present invention is carried out in combination with a process for separating m-xylene from a xylene mixture by an extracting agent consisting of hydrogen fluoride and boron fluoride or a process for separating trimethyl benzene from the mixture by said extracting agent, because the common extracting solvent can be utilized.

EXAMPLE 1

An RDC (Rotating Disc Contactor) type extraction column having a height of 1,200 mm., which consisted of units having an inner diameter of 40 mm. and unit height of 20 mm. provided with a rotating disc having a diameter of 24 mm. and a baffle plate having an inner diameter of 30 mm., was employed. 8.6 kg./hr. of a complex solution having a composition of hydrogen fluoride:boron fluoride:m-xylene=10:1:0.8 by mole was fed to the column from the top as an extracting solvent, and 2.25 kg./hr. of a raw material hydrocarbon mixture consisting of 29% by weight of benzene, 33% by weight of toluene and 38% by weight of hexane was fed to the column from the bottom, whereby extraction was effected. As a result, a raffinate solution consisting of 7% by weight of benzene, 11% by weight of toluene, 2% by weight of m-xylene and 80% by weight of hexane was obtained from the top of the column, and 0.56 kg./hr. of benzene and 0.61 kg./hr. of toluene were obtained as an extracted solution from the bottom of the column. The extraction column was operated with the rotating discs at 800 r.p.m. at a temperature of 5° C. under a pressure of 2 kg./cm.$^2$ g.

EXAMPLE 2

The same extracting column as in Example 1 was used. 11.0 kg./hr. of a complex solution having a composition of hydrogen fluoride:boron fluoride:m-xylene=10:1:0.8 by mole was fed to the column from the top as an extracting solvent and 3.53 kg./hr. of $C_8$ fraction of catalytic reformate was fed to the column from the bottom as a raw material for extraction. The raw material for extraction consisted of 90% by weight of xylenes and 10% by weight of non-aromatic hydrocarbons. The xylenes had a composition of ethylbenzene:p-xylene:m-xylene:o-xylene=20:20:43:17. As a result of the extraction, a hydrocarbon stream consisting of 48% by weight of xylenes and 52% by weight of non-aromatic hydrocarbons (the xylenes having a composition of ethylbenzene:p-xylene:m-xylene:o-xylene=34:31:10:25) was obtained as a raffinate from the top of the column. 2.93 kg./hr., from which the weight of m-xylene originally present in the extracting agent was subtracted, of xylene mixture was extracted into the extract solution from the bottom of the column. The extraction column was operated with the rotating discs at 600 r.p.m. at a temperature of 15° C. under a pressure of 2 kg./cm.$^2$ g.

EXAMPLE 3

9.0 kg./hr. of a complex solution having a composition of hydrogen fluoride:boron fluoride:trimethylbenzenes=10:1.5:1.2 by mole, the trimethylbenzenes having a composition of mesitylene:pseudocumene=2:1 by mole, was fed to the same extraction column as in Example 1 from the top as an extracting solvent, and a catalytic reformate consisting of 5.7% by weight of benzene, 20.0% by weight of toluene, 26.3% by weight of xylene and 48.0% by weight of non-aromatic hydrocarbons was fed to the column from the bottom as a raw material for extraction. As a result, a raffinate consisting of 0.1% by weight of benzene, 2.6% by weight of toluene, 9.8% by weight of xylene, and 87.5% by weight of non-aromatic hydrocarbons was obtained from the top of the column, and 0.16 kg./hr. of benzene, 0.54 kg./hr. of toluene and 0.61 kg./hr. of xylenes were extracted into the extracting solvent from the bottom of the column. The extraction column was operated with the rotating discs at 800 r.p.m. at a temperature of 20° C. under a pressure of 2 kg./cm.$^2$ g.

EXAMPLE 4

According to the flow sheet of FIG. 3, a reformate comprising benzene, toluene, xylene and non-aromatic hydrocarbon was contacted with an extracting solvent consisting of hydrogen fluoride-boron-fluoride-m-xylene, whereby extraction was effected. The extracted solution thus obtained was fed to m-xylene extraction column and contacted with an extracting agent consisting of hydrogen fluoride and boron fluoride and a diluent. m-Xylene was extracted into a hydrogen fluoride layer to make a complex solution. A part of said complex solution was used as an extracting solvent of the aforementioned reformate, and other part was decomposed into hydrogen fluoride-boron fluoride and m-xylene. The operating temperature of the aromatic hydrocarbon extraction column was 5° C., and the pressure was 2 kg./cm.$^2$ g. The material balance of each flow according to FIG. 3 is given in Table 1.

TABLE 1

| Component (kg./hr.) | Stream No. in FIG. 3 | | | | | | | | | | | |
|---|---|---|---|---|---|---|---|---|---|---|---|---|
| | 10 | 18 | 11 | 19 | 5 | 6 | 7 | 8 | 9 | 15 | 16 | 20 |
| Example 4: | | | | | | | | | | | | |
| Benzene | 3.91 | 0 | 0.39 | 3.52 | | | | 3.52 | 0 | 0 | 0 | |
| Toluene | 9.21 | 0 | 0.92 | 8.29 | | | | 8.29 | 0 | 0 | 0 | |
| Ethylbenzene | 2.65 | 0 | 0.32 | 2.33 | | | | 2.33 | 0 | 0 | 0 | |
| p-Xylene | 1.91 | 0 | 0.18 | 1.73 | | | | 1.73 | 0 | 0 | 0 | |
| m-Xylene | 4.67 | 11.89 | 0.42 | 16.14 | | | | 0 | 16.14 | 4.25 | 4.25 | |
| o-Xylene | 1.38 | 0 | 0.14 | 1.24 | | | | 1.24 | 0 | 0 | 0 | |
| Non-aromatic hydrocarbons | 25.0 | 0 | 24.7 | 0.3 | | | | 0.3 | 0 | 0 | 0 | |
| HF | | 30.0 | 0 | | 30.0 | | 10.8 | | 0 | 40.8 | 10.8 | 0 |
| BF$_3$ | | 10.2 | 0 | | 10.2 | | 3.66 | | 0 | 13.86 | 3.66 | 0 |
| Pentanes | | 0.07 | 0.07 | | | | 10.8 | 10.7 | 0.1 | 0.03 | 0.03 | |
| Example 5: | | | | | | | | | | | | |
| Ethylbenzene | 2.65 | 0 | 0.32 | 2.33 | 0 | | | 2.33 | 0 | 0 | 0 | |
| p-Xylene | 1.91 | 0 | 0.18 | 1.73 | 2.23 | | | 3.96 | 0 | 0 | 0 | |
| m-Xylene | 4.67 | 5.10 | 0.42 | 9.35 | 10.1 | | | 0 | 19.4 | 14.3 | 14.3 | |
| o-Xylene | 1.38 | 0 | 0.14 | 1.24 | 2.02 | | | 3.26 | 0 | 0 | 0 | |
| Non-aromatic hydrocarbons | 1.10 | 0 | 0.99 | 0.11 | 0 | | | 0.11 | 0 | 0 | 0 | |
| HF | | 12.0 | 0 | | 12.0 | 8.00 | 25.8 | | 0 | 45.8 | 33.8 | 8.0 |
| BF$_3$ | | 4.07 | 0 | | 4.07 | 2.71 | 8.75 | | 0 | 15.5 | 11.5 | 2.75 |
| Pentanes | | 0.16 | 0.16 | | | 3.60 | 13.0 | 16.2 | 0.4 | 0.24 | 0.24 | |

EXAMPLE 5

The extracting operation was carried out in the manner similar to that in Example 4 except that C$_8$ fraction of reformate was used as the raw material of aromatic hy-

What is claimed is:

1. A process for separating aromatic hydrocarbons from a mixture of aromatics and paraffinic non-aromatics which comprises contacting at a temperature of 30° C. to —20° C. a mixture of aromatics comprising at least one selected from the group consisting of benzene, toluene, xylene and ethylbenzene, and paraffinic non-aromatics with a complex solution consisting of hydrogen fluoride, boron fluoride and at least one member selected from the group consisting of m-xylene and polymethylbenzenes of C$_9$ and higher as an extracting agent, and separating a hydrocarbon phase rich in paraffinic non-aromatics and lean in aromatics, and an acid phase comprising hydrogen fluoride, boron fluoride, m-xylene or polymethylbenzene of C$_9$ and higher, and at least one of benzene, toluene, xylene and ethylbenzene, wherein the complex solution has a molar ratio of boron fluoride to hydrogen fluoride of 0.05–0.20:1 and a molar ratio of at least one member selected from the group consisting of m-xylene and polymethylbenzenes of C$_9$ and higher to boron fluoride of 0.6–0.9:1 is used.

2. A process according to claim 1, wherein the contacting is carried out under a pressure of 0.5 to 5 kg./cm.$^2$ g.

3. A process for separating aromatic hydrocarbons from a mixture of aromatics and paraffinic non-aromatics which comprises contacting at a temperature of 30° C. to —20° C. a mixture of aromatics comprising at least one selected from the group consisting of benzene, toluene, xylene and ethylbenzene and paraffinic non-aromatics with a complex solution consisting of hydrogen fluoride, boron fluoride and at least one member selected from the group consisting of m-xylene and polymethylbenzenes of C$_9$ and higher as an extracting agent, separating a hydrocarbon phase rich in paraffinic non-aromatics and lean in aromatics, and an acid phase comprising hydrogen fluoride, boron fluoride, m-xylene or polymethylbenzene of C$_9$ and higher, and at least one of benzene, toluene, xylene and ethylbenzene and contacting the acid phase with a back-extracting solvent thereby to back-extract other aromatic hydrocarbons than said member, wherein the complex solution has a molar ratio of boron fluoride to hydrogen fluoride of 0.05–0.20:1 and a molar ratio of at least one member selected from the group consisting of m-xylene and polymethylbenzenes of C$_9$ and higher to boron fluoride of 0.6–0.9:1 is used.

4. A process according to claim 3, wherein the back-extracting agent is a saturated hydrocarbon readily separable from the back-extracted aromatic hydrocarbons by distillation.

5. A process for separating aromatic hydrocarbons from a mixture of aromatics and paraffinic non-aromatics which comprises contacting at a temperature of 30° C. to —20° C. a mixture of aromatics comprising at least one selected from the group consisting of benzene, toluene, xylene and ethylbenzene, and paraffinic non-aromatics with a complex solution consisting of hydrogen fluoride, boron fluoride and at least one member selected from the group consisting of m-xylene and polymethylbenzenes of $C_9$ and higher as an extracting agent, separating a hydrocarbon phase rich in paraffinic non-aromatics and lean in aromatics, and an acid phase comprising hydrogen fluoride, boron fluoride, m-xylene or polymethylbenzene of $C_9$ and higher, and at least one of benzene, toluene, xylene and ethylbenzene, thermally decomposing the resulting acid phase thereby to remove hydrogen fluoride and boron fluoride from the acid phase, and distilling the resulting hydrocarbon thereby to recover the aromatic hydrocarbons from said member, wherein the complex solution has a molar ratio of boron fluoride to hydrogen fluoride of 0.05–0.20:1 and a molar ratio of at least one member selected from the group consisting of m-xylene and polymethylbenzene of $C_9$ and higher to boron fluoride of 0.6–0.9:1 is used.

6. A process for separating aromatic hydrocarbons from a mixture of aromatics and paraffinic non-aromatics which comprises contacting at a temperature of 30° C. to −20° C. a hydrocarbon mixture containing at least one member selected from the group consisting of m-xylene and polymethylbenzenes of $C_9$ and higher with diluent and an extracting agent consisting of hydrogen fluoride and boron fluoride thereby to extract said member as a complex solution of hydrogen fluoride, boron fluoride and said member, contacting a portion of the resulting complex solution as an extracting agent with a mixture of aromatics comprising at least one selected from the group consisting of benzene, toluene, xylene and ethylbenzene, and paraffinic non-aromatics, separating a hydrocarbon phase rich in non-aromatics and lean in aromatics, and an acid phase comprising hydrogen fluoride, boron fluoride, m-xylene or polymethylbenzene of $C_9$ and higher, and at least one of benzene, toluene, xylene, and ethylbenzene, contacting the resulting acid phase with the diluent and the extracting agent consisting of hydrogen fluoride and boron fluoride as a raw material of the above first step thereby to separate benzene, toluene, xylene other than m-xylene or ethylbenzene as raffinate from the acid phase, and thermally decomposing the remaining portion of the complex solution thereby to remove hydrogen fluoride and boron fluoride from said member, wherein the complex solution has a molar ratio of boron fluoride to hydrogen fluoride of 0.05–0.20:1 and a molar ratio of at least one member selected from the group consisting of m-xylene and polymethylbenzene of $C_9$ and higher to boron fluoride of 0.6–0.9:1 is used.

References Cited
UNITED STATES PATENTS

| | | | |
|---|---|---|---|
| 2,343,744 | 3/1944 | Burk | 260—674 |
| 2,738,372 | 3/1956 | Talbot | 260—674 |
| 2,848,518 | 9/1958 | Fragen | 260—674 |
| 3,155,738 | 11/1964 | Suld | 260—674 |
| 3,309,414 | 3/1967 | McCaulay | 260—674 |

DELBERT E. GANTZ, Primary Examiner

C. E. SPRESSER, Jr., Assistant Examiner

U.S. Cl. X.R.

260—674 A, 674 SE